(12) United States Patent
Huang et al.

(10) Patent No.: US 8,113,844 B2
(45) Date of Patent: Feb. 14, 2012

(54) METHOD, SYSTEM, AND COMPUTER-READABLE RECORDING MEDIUM FOR SYNCHRONOUS MULTI-MEDIA RECORDING AND PLAYBACK WITH END USER CONTROL OF TIME, DATA, AND EVENT VISUALIZATION FOR PLAYBACK CONTROL OVER A NETWORK

(75) Inventors: Lucas K. Huang, Columbia, MD (US); Chafic A. Kazoun, Chevy Chase, MD (US)

(73) Assignee: Atellis, Inc., Silver Spring, MD (US)

( * ) Notice: Subject to any disclaimer, the term of this patent is extended or adjusted under 35 U.S.C. 154(b) by 1118 days.

(21) Appl. No.: 11/611,792

(22) Filed: Dec. 15, 2006

(65) Prior Publication Data

US 2008/0145830 A1 Jun. 19, 2008

(51) Int. Cl.
*G09B 23/28* (2006.01)
(52) U.S. Cl. ..... 434/262; 434/219; 434/308; 434/307 R; 434/319; 434/365; 707/809
(58) Field of Classification Search ........... 434/246, 434/262, 322, 365; 707/809
See application file for complete search history.

(56) References Cited

U.S. PATENT DOCUMENTS

| | | | | |
|---|---|---|---|---|
| 5,077,666 A | * | 12/1991 | Brimm et al. | 705/2 |
| 5,441,047 A | * | 8/1995 | David et al. | 600/483 |
| 5,553,609 A | * | 9/1996 | Chen et al. | 600/301 |
| 5,755,577 A | * | 5/1998 | Gillio | 434/262 |
| 5,769,640 A | * | 6/1998 | Jacobus et al. | 434/262 |
| 6,077,082 A | * | 6/2000 | Gibson et al. | 434/262 |
| 6,332,147 B1 | | 12/2001 | Moran et al. | |
| 6,370,457 B1 | | 4/2002 | Nemeth | |
| 6,430,997 B1 | | 8/2002 | French et al. | |
| 6,739,877 B2 | * | 5/2004 | Bailey et al. | 434/262 |
| 7,134,074 B2 | * | 11/2006 | Munetsugu et al. | 715/204 |
| 7,231,135 B2 | * | 6/2007 | Esenyan et al. | 386/241 |
| 7,265,663 B2 | | 9/2007 | Steele | |
| 7,860,725 B2 | * | 12/2010 | Gopinathan et al. | 705/2 |
| 2003/0105558 A1 | | 6/2003 | Steele | |
| 2003/0132959 A1 | | 7/2003 | Simister et al. | |
| 2004/0223054 A1 | * | 11/2004 | Rotholtz | 348/143 |
| 2005/0264472 A1 | | 12/2005 | Rast | |
| 2006/0052684 A1 | * | 3/2006 | Takahashi et al. | 600/407 |
| 2006/0253781 A1 | | 11/2006 | Pea et al. | |
| 2007/0035561 A1 | * | 2/2007 | Bachelder et al. | 345/633 |
| 2007/0111174 A1 | * | 5/2007 | Kozmenko et al. | 434/262 |
| 2007/0143493 A1 | * | 6/2007 | Mullig et al. | 709/232 |

OTHER PUBLICATIONS

PCT International Search Report and Written Opinion of the International Searching Authority, issued Jul. 28, 2008, application No. PCT/US07/87489.

\* cited by examiner

*Primary Examiner* — Kang Hu
(74) *Attorney, Agent, or Firm* — Sughrue Mion, PLLC

(57) ABSTRACT

A system and system are provided for providing synchronous multimedia recording and playback. Aspects the exemplary embodiment include in response to a training session is being conducted, synchronously recording in real-time simulator data from a simulator captured by a simulator capture tool, and video of the training session captured by a plurality of A/V sources; encoding each of the videos captured by the plurality of A/V sources as respective digital media files formatted as streaming media; and transmitting both the simulator data and the video media files from a server to a client over a network, such that when the client receives the simulator data and the stream, the respective videos are synchronously played back with the simulator data on the client.

57 Claims, 11 Drawing Sheets

In response to a training session being conducted, synchronously record in real-time both simulator data from a simulator data source captured by a simulator capture tool, and video of the training session captured by a plurality of the A/V sources
200

Encode the each of the videos captured by A/V sources as respective digital media files in streaming media format
202

Transmit both the simulator data and a stream of the video media files from a server to the client over the network, such that when the client receives the simulator data and the stream, the respective videos are synchronously played back with the simulator data on the client
204

FIG. 2

METHOD, SYSTEM, AND COMPUTER-READABLE RECORDING MEDIUM FOR SYNCHRONOUS MULTI-MEDIA RECORDING AND PLAYBACK WITH END USER CONTROL OF TIME, DATA, AND EVENT VISUALIZATION FOR PLAYBACK CONTROL OVER A NETWORK

BACKGROUND OF THE INVENTION

The use of simulation training is growing rapidly. A simulation training session is one in which training of personnel is performed through the use of a simulator device that outputs real-time data in response to interactions of the trainees. In the medical industry, for example, medical training centers conduct simulation training that generally involve students performing simulated medical procedures and/or examinations on a mannequin simulator, which exhibits symptoms of various ailments of a patient during simulated examination sessions. Other types of medical simulators include EKG machines, blood pressure monitors, and virtual reality endoscopic, laparoscopic, and endovascular simulators. During each simulated examination session, which usually takes place in an assigned examination room, the student interacts with the patient during an appointed time period to make a diagnosis of the patient's ailment and to prescribe a proposed treatment plan or perform a procedure. Each examination room is equipped with monitoring equipment, including audio, visual and time recoding devices, so that the student's simulated encounter with the patient can be monitored in real time by an evaluator, such as a faculty member or upper class person. Typically, simulation training sessions are also recorded on video for subsequent analysis and teaching purposes. A similar configuration is used in other industries for other types of training sessions.

The monitoring equipment in the examination rooms may include multiple audio/video (A/V) sources, e.g. video cameras, to provide various camera angles of the training session. A typical recording training session may have three video feeds, for instance, taken from different camera angles, and one of the video feeds might show a machine that displays data from a simulator, such as EKG, heart rate, or blood pressure data. The data from each of the A/V sources is sent to a respective recording/playback device, e.g., a digital video (DV) recorder, for recording onto some type of hard recording medium, such as DVDs or DV tapes. This results in the output of each of the video cameras, for example, to be stored on separate medium during the training session. Optionally, the system may have the recording/playback devices synced together by a time sync generator. Each of the recording mediums produced by the multiple recording/playback devices, whether DVDs or DV tapes, are typically stored as a tape archive in a multimedia library.

In addition, the video recorded by each of the A/V sources may also be input to a video/audio mixer or processor of some type. Typically, the mixer merges the video feeds from the A/V sources and the output is recorded onto a recording medium as a merged video with multiple windows, one for each video feed. Another method is to overlay the simulator data as a composite image with the video feeds, like a picture-in-picture. One problem with this method, however, is that typically the overlay picture obscures part of the underlying image. The recording media, e.g., DVD or DV tape, may then also be archived in the multimedia library. After all the video is stored and edited, each of the videos needs to be manually associated with each of the trainees for later retrieval.

While viewing the training session during the recording, a trainer manually identifies performance events/issues, and manually notes the time during the video in which the event occurred. Once the simulation exercise is completed, the recording is stopped. Thereafter, the trainer conducts a debriefing session with the trainee(s) to evaluate the trainee's performance. Debriefing sessions can be performed right after the training session using the unmixed recordings, during which, the trainer plays back portions of recordings and analyzes the performance of the trainee using their notes as a guide. Since unmixed recordings are used, this process often involves lots of rewinding and fast-forwarding to get to points of interest.

Sometimes the trainer may desire to perform what is known as a highlighted debriefing session. In a highlighted debriefing session, the trainer plays back just a portion of the training session(s) for a detailed analysis with the trainee. To enable the highlighted debrief session, a post-video editing process is required to extract clips of specific examples from the various media stored in the multimedia library. For example, assume that a trainer wants to make a video of where trainee makes the most mistakes. This would require the finding and retrieving of the videos that contain the key clips from the multimedia library. During the video editing process, the clips are extracted from the video, and then either merged to create a video overlay, or the clips are mixed and alternated. After the video editing process is completed, the modified video is stored in the multimedia library, and then retrieved by the trainer in order to conduct the highlighted debrief session.

Although recording simulation training sessions has definite advantages in terms of being a useful teaching tool, the conventional system described above has several problems. One problem is that the system does not allow quantifiable individual feedback. Instead, the training session is often subjectively evaluated or graded based on what the trainer or reviewer thought they saw or didn't see during recorded exercise. A related problem is that to comment on a specific event that occurred during the training session, the trainer or reviewer must either remember where in the recorded event occurred, or note a time index in their notes. In addition, if the trainer wants to highlight a specific area of interest in the recording, the trainer may have to have the recording played and the segment of interest recorded separately during the editing process. For training centers that have a large number of training sessions and a large number of recordings per training session, such constant editing can be a significant burden in terms of manpower and cost.

Another problem is that the training sessions are stored on media such as DVD or DV tape that must be manually indexed and stored for archival. Since this is a manual process, problems may arise when attempting to find a particular recording for a particular training session or trainee. In addition, the recordings archived in the multimedia library may not be readily accessible to reviewers, particularly if the reviewers are not in the same location as the multimedia library. For these reasons, access to the recordings may not be possible or highly cumbersome as a number of training sessions recorded increases, which in turn, may limit the number of users who can view the recordings for evaluation or grading.

Accordingly, a need exists for an improved method and system for providing synchronous multimedia recording and playback, particularly in the area of simulation training as one example.

BRIEF SUMMARY OF THE INVENTION

A method and system is provided for providing synchronous multimedia recording and playback. Aspects the exemplary embodiment include in response to a training session is being conducted, synchronously recording in real-time simulator data from a simulator captured by a simulator capture tool, and video of the training session captured by a plurality of A/V sources; encoding each of the videos captured by the plurality of A/V sources as respective digital media files formatted as streaming media; and transmitting both the simulator data and the video media files from a server to a client over a network, such that when the client receives the simulator data and the stream, the respective videos are synchronously played back with the simulator data on the client.

According to the method and system disclosed herein, all available training session video and simulator sources may be encoded into a streamable format as independent video files and streamed onto the network. This facilitates remote viewing of activity and real-time performance assessments of the training session. The assessment information is instantly tabulated and available to help drive a more objective feedback/debrief session using actual simulation trend data and multiple assessments, all synchronously tied to multiple video feeds.

BRIEF DESCRIPTION OF SEVERAL VIEWS OF THE DRAWINGS

FIG. 2 is a flow diagram illustrating a process implemented by the simulation training system for providing synchronous multimedia recording and playback in accordance with the exemplary embodiment.

DETAILED DESCRIPTION OF THE INVENTION

The present invention relates to synchronous multimedia recording and playback. The following description is presented to enable one of ordinary skill in the art to make and use the invention and is provided in the context of a patent application and its requirements. Various modifications to the preferred embodiments and the generic principles and features described herein will be readily apparent to those skilled in the art. The end-user is also allowed to select what simulator variables are displayed. Thus, the present invention is not intended to be limited to the embodiments shown, but is to be accorded the widest scope consistent with the principles and features described herein.

The embodiments disclosed herein are mainly described in terms of particular device and system provided in particular implementations. However, one of ordinary skill in the art will readily recognize that this method and system will operate effectively in other implementations. For example, the devices usable with the present invention can take a number of different forms. The present invention will also be described in the context of particular methods having certain steps. However, the method and system operate effectively for other methods having different and/or additional steps not inconsistent with the present invention.

The exemplary embodiment provides a web-based simulation training system for providing synchronous multimedia recording and playback of recorded training sessions. Training sessions are recorded, and the recordings include not only synchronized video from multiple cameras, but also simulation data recorded from a simulator. Streaming technology is then utilized to allow end-users to access the recordings over the Internet via a browser and view and configure the recorded training sessions in real-time. The end-user is allowed to select which video streams are played back and to jump to any point along the recording time line, at which point all the videos and simulation data automatically play back at that point in time. Thus, the system provides synchronous multimedia recording and playback with user playback control of time, data, and event visualization over a network.

Figure 1:
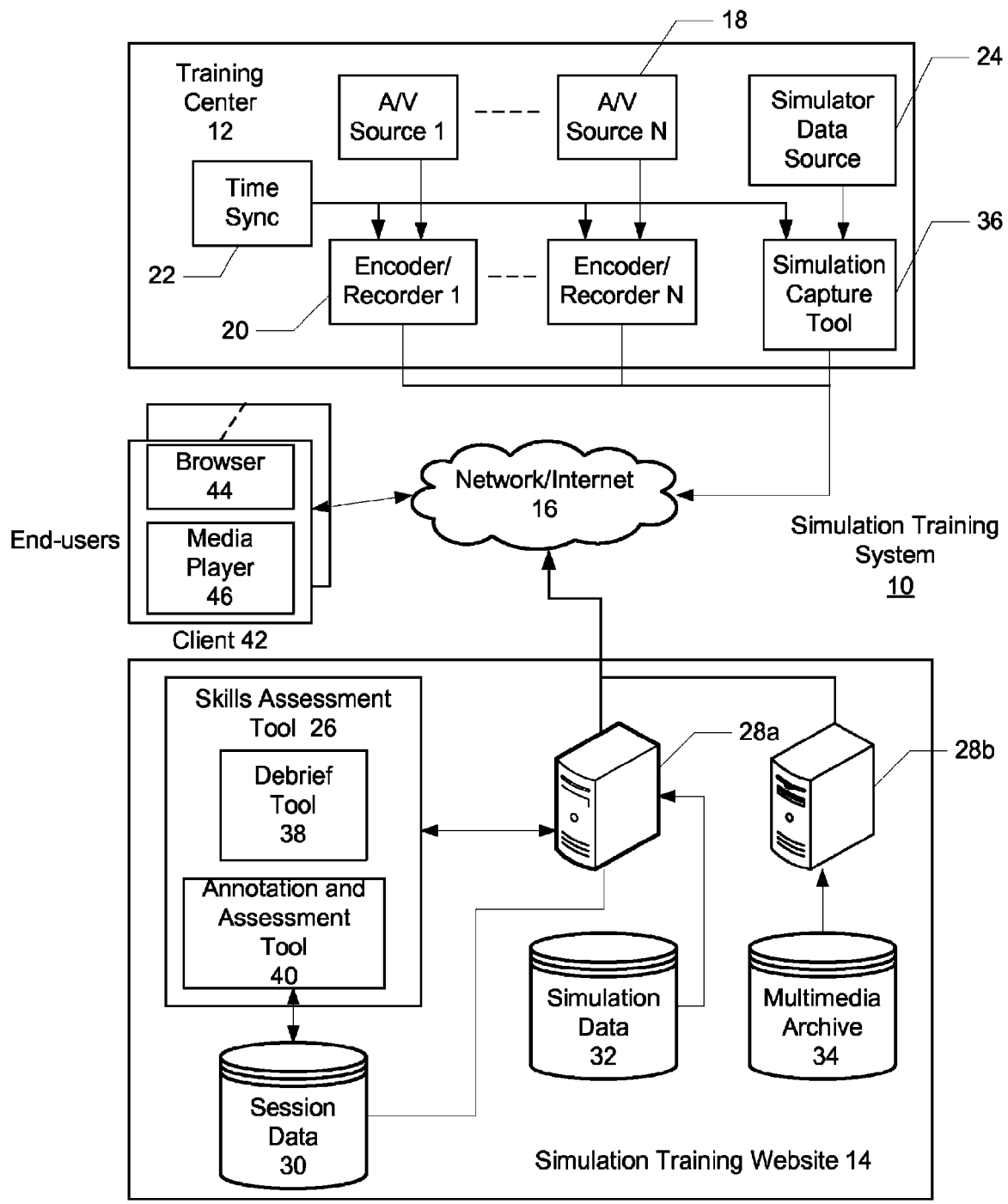
FIG. 1 is a block diagram of a simulation training system in accordance with an exemplary embodiment.

FIG. 1 is a block diagram of a simulation training system in accordance with an exemplary embodiment. The exemplary embodiment provides a web-based simulation training system 10 for providing synchronous multimedia recording and playback of recorded training sessions. The simulation training system 10 includes a training center 12 that includes equipment for communicating with a simulation training website 14 over a network 16, such as Internet. The training center 12 conducts and records simulation training sessions in one or more training rooms equipped with multiple audio/video (A/V) sources 18, multiple encoder/recorders 20, a time sync generator 22, and a simulator data source 24.

The training sessions are recorded using the A/V sources 18 and the data is sent to respective encoders/recorders 20. The A/V sources 18 in an exemplary environment will be described as video cameras, but A/V sources 18 include any type of capture device, such as an auxiliary microphone or a still camera, and the like. The training sessions involve one or more trainees (not shown) who perform simulated procedures, or otherwise interact with, at least one simulator data source 18 that outputs real-time data in response. The type of training conducted by the training center 12 will be described in terms of medical training that would be suitable for doctors, nurses, and emergency response personnel, but the exemplary embodiments are applicable any type of training that involves the use of a any type of simulator. Example types of simulator data sources 18 in the medical industry, for instance, include full-body mannequin simulators, virtual reality simulators, EKG machines, and blood pressure monitors.

The online simulation training website 14 includes a software suite referred to as a skills assessment tool 26, a web server 28a and a video on demand server 28b (collectively referred to as servers 28), a session data archive 30, a simulation data archive 32, and a multimedia archive 34. The skills assessment tool 26 hosted on the simulation training website 14 includes a debrief tool 38 and annotation and assessment tool 40. The servers 28 hosting the simulation training website 14 may be implemented as one server or any number of servers.

In another embodiment, the encoders/recorders 20 and the simulation capture tool 36 may be located remote from the training center, e.g., at the physical location of the simulation training website 14. In another embodiment, all the components shown in the simulation training website 14, including the encoders/recorders 20 and the simulation capture tool 36 may be implemented as a single physical device. Further, the simulation training website 14 may be implemented as a custom application that is installed at the training center 12, and accessed directly by clients 42 over a network.

FIG. 2 is a flow diagram illustrating a process implemented by the simulation training system 10 for providing synchronous multimedia recording and playback in accordance with the exemplary embodiment. Referring to both FIGS. 1 and 2, the process begins in response to a training session being conducted by synchronously recording in real-time both simulator data from a simulator data source 24 captured by a simulator capture tool, and video of the training session captured by a plurality of the A/V sources 18 (block 200).

According to the exemplary embodiment, the simulator data is captured by simulation capture tool 36. The time sync generator 22 is coupled to the encoders/recorders 20 and to the simulator capture tool 36 to control the synchronization of the recordings. In one embodiment, the simulation capture tool 36 is provided by the simulation training website 14, but is installed and executed on a computer (not shown) at the training center 12 that communicates with the simulator data source 24. In another embodiment, the simulation capture tool 36 may be located remote from the simulator data source 24, such as at the simulation training website 14.

During the recording, the each of the videos captured by A/V sources 18 are encoded as respective digital media files in streaming media format (block 202). As used herein, streaming media is media that is consumed (heard and/or viewed) while the media is being delivered. The videos captured by the A/V sources 18 may be encoded by the encoders/decoders 20. In one embodiment, the digital media files are encoded as MPEG-4 files, but other formats may also be used.

In the exemplary embodiment, the simulator data may be captured 36 as telemetry values captured in its raw and/or compressed format. The telemetry values can then be visualized using a thin client, such as Flash Player™, as a function of time. In another embodiment, the simulator data can be captured using one of the A/V sources 18 by recording a video of the output of the simulator itself, e.g., by capturing a video of an EKG display. The simulation data may be encoded by the simulation capture tool 36.

During recording of the training session, the simulation data and the digital media files of the video feeds are transmitted to the simulation training website 14. The simulation data is sent to the simulation training website 14 by simulation capture tool 36, where it stored in the simulation data archive 32 and indexed by an ID of the training session. The video media files are sent to the simulation training website 14 by the encoders/decoders and are stored in the multimedia archive 34.

After all the captured data is transmitted to the simulation training website 14 and stored, the server 18 transmits both the simulator data and a stream of the video media files to the client 42 over the network 16, such that when the client 42 receives the simulator data and the stream, the respective videos are synchronously played back with the simulator data on the client 42 (block 204).

In one embodiment, the skills assessment tool 26 causes the server 28 to transmit the simulator data and the stream of the video media files in response to receiving a request to view a recorded training session. Referring to FIG. 1, according to the exemplary embodiment, an end-user of a client 42 may access the skills assessment tool 38 using a browser 44 and submit a request to view the training session. The end-user request can be made prior to, or during, a live training session for real-time viewing of the recording, or after the training session is complete. If the request is for a real-time viewing of the recording, then the end-user may represent a trainer/faculty member, a trainee/student observer, or other type of evaluator/reviewer. If the request is for a prerecording training session, then the end-user may also represent the trainers and trainees that took part in the training session. In another embodiment, the skills assessment tool 26 causes the server 28 to transmit the simulator data and the stream of the video media files to the client 42 automatically based on some preconfigured settings.

Figure 3A:
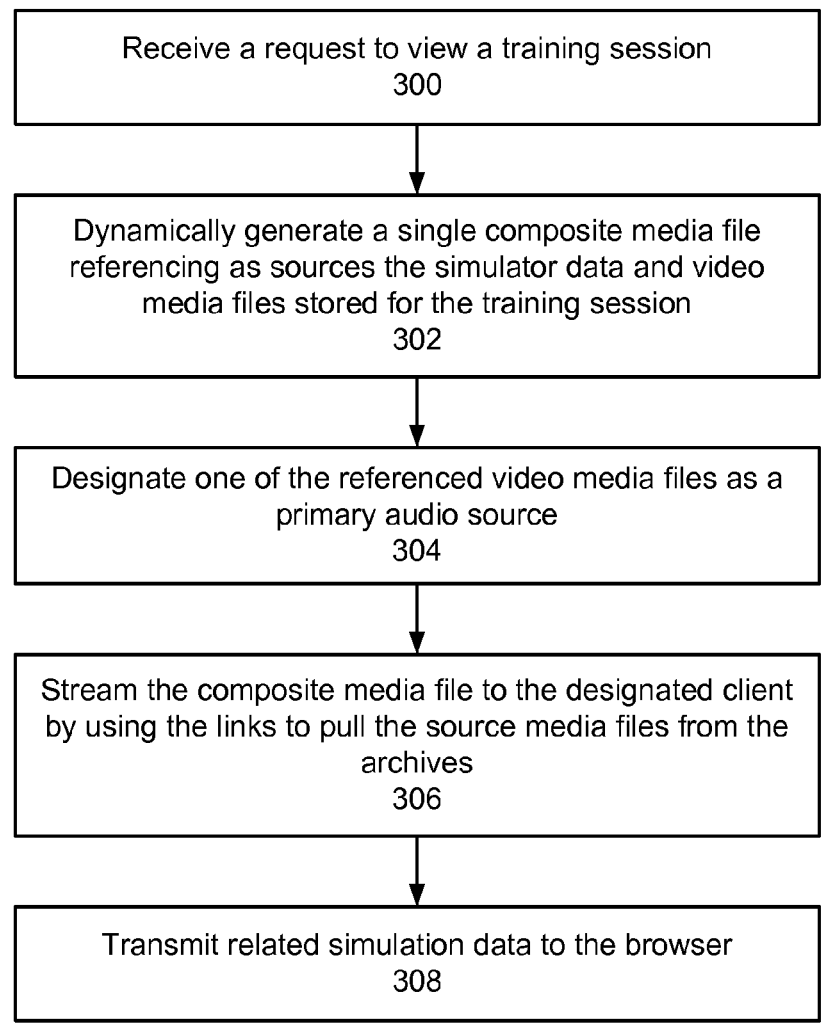
FIG. 3A is a flow diagram illustrating a process performed by the skills assessment tool synchronous display the simulation data and streaming video media files on the client.

FIG. 3A is a flow diagram illustrating a process performed by the skills assessment tool 26 for synchronous display of the simulation data and the stream of video media files on the client 42. The process begins in response to the skill assessment tool 26 receiving a request to view a training session (block 300). The skills assessment tool 26 then dynamically generates a single composite media file referencing as sources the video media files stored for a training session (block 302). In one embodiment, the composite media file is encoded as a streaming MPEG-4 file.

Figure 3B:
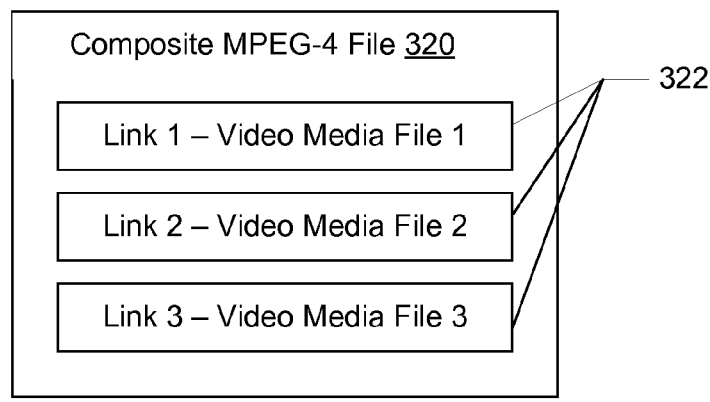
FIG. 3B is a diagram graphically illustrating a composite media file according to an exemplary embodiment.

FIG. 3B is a diagram graphically illustrating a composite media file according to an exemplary embodiment. In this example, the skills assessment tool 26 created a composite media file 320 in MPEG-4 movie format that includes three links referencing three video media files 322.

Referring again to FIG. 3A, after the composite media file 320 is generated, one of the referenced video media files 322 is designated as a primary audio source (block 304) to control audio playback during synchronous video playback. In one embodiment, the first video media file 322 referenced in the composite media file 300 may be designated the primary audio source by default. The audio portion of the primary audio source may be used to synchronize the videos at the time of playback. The audio portions of the other video media files 322 may be turned-off.

The skills assessment tool 16 has a user interface that is displayed in the browser 44 of the client 42. To fulfill the end-user's request to view the training session, the skills assessment tool 16 sends the composite media file 320 to the video-on-demand server 28b. The video-on-demand server 28b streams the composite media file 320 to browser of the designated client 42 by using the links to pull the source media files 322 and 324 from the archives 32 and 34 and sending them through the stream (block 306). Thus, since the media files are added to the composite media file 322 prior to playback and viewing, the exemplary embodiment provides a system for premixing the video, rather than a mixing of the video during playback. At the same time the skills assessment tool 16 retrieves the related simulation data from the simulation data archive 32 and sends the simulation data to the browser 44 (308), in one embodiment, via the web server 28a.

When the simulation data and the streamed composite media file 322 is received on the client 42, a media player 46 compatible with the format of the stream is automatically invoked. Example types of media players 46 for playing streaming media include Apple QuickTime™ and Flash Player™, for instance. The media player 46 then visualizes the simulation data and plays it in synchronization with the videos based on the time of the recordings. In one embodiment, the media player 46 opens within the browser 44. In another embodiment, the media player 46 opens outside the browser 44. In another embodiment, the videos may be streamed individually from the server 28b, and then synchronized on the client 42 by the media play 46.

Because the media player 46 receives a single streamed media file referencing each of the videos, the simulator data and each of the videos (with audio) can be synchronously played in the single interface of the skills assessment tool 40 as displayed by the media player 46. More specifically, the display screen of the skills assessment tool 40 is divided into separate windows corresponding to each of the source files included in the composite media file 300 and the simulation data.

Figure 4A:
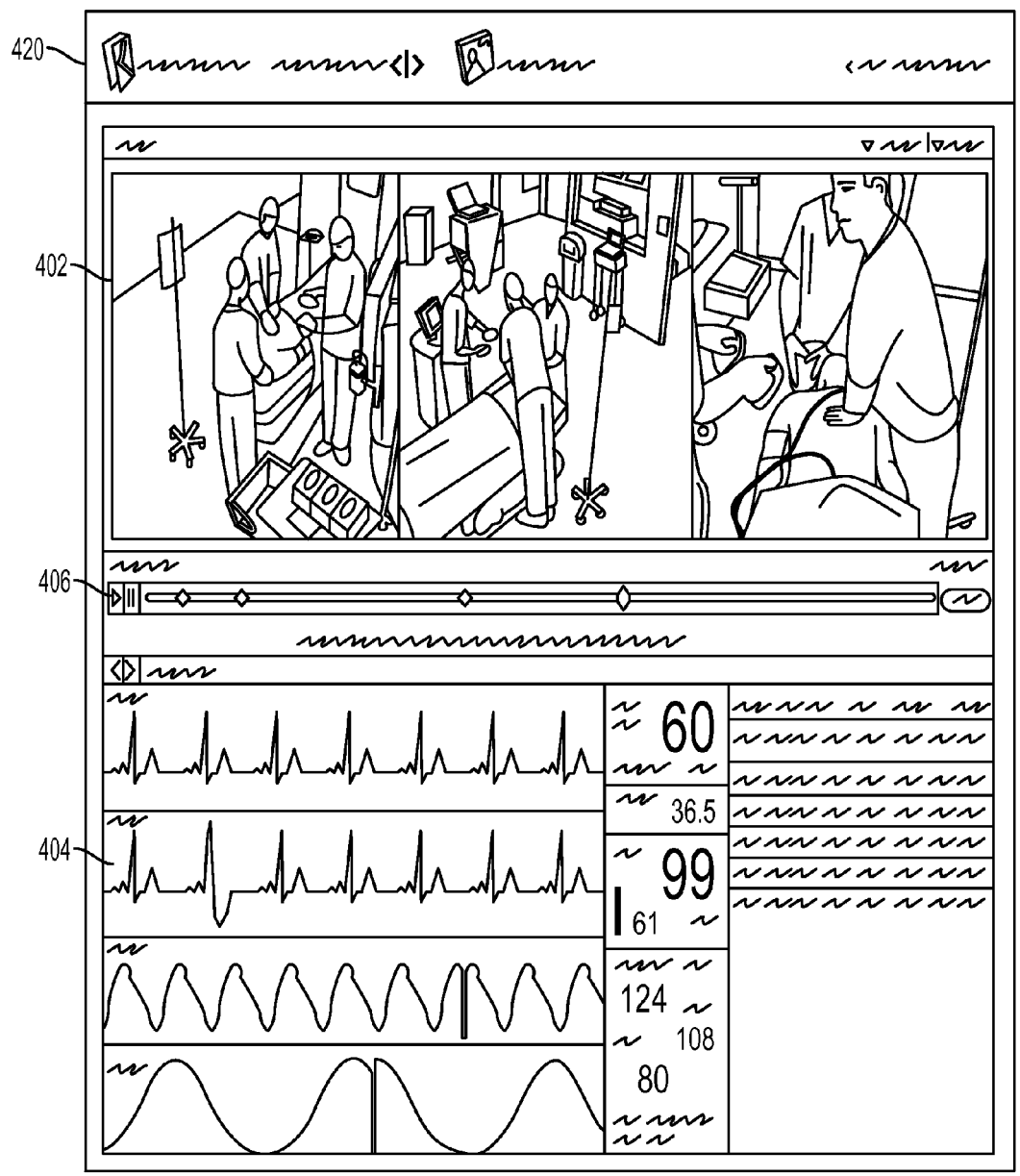
FIGS. 4A through 4D are example screenshots of the interface of the skills assessment tool when the playing the stream.
Figure 4B:
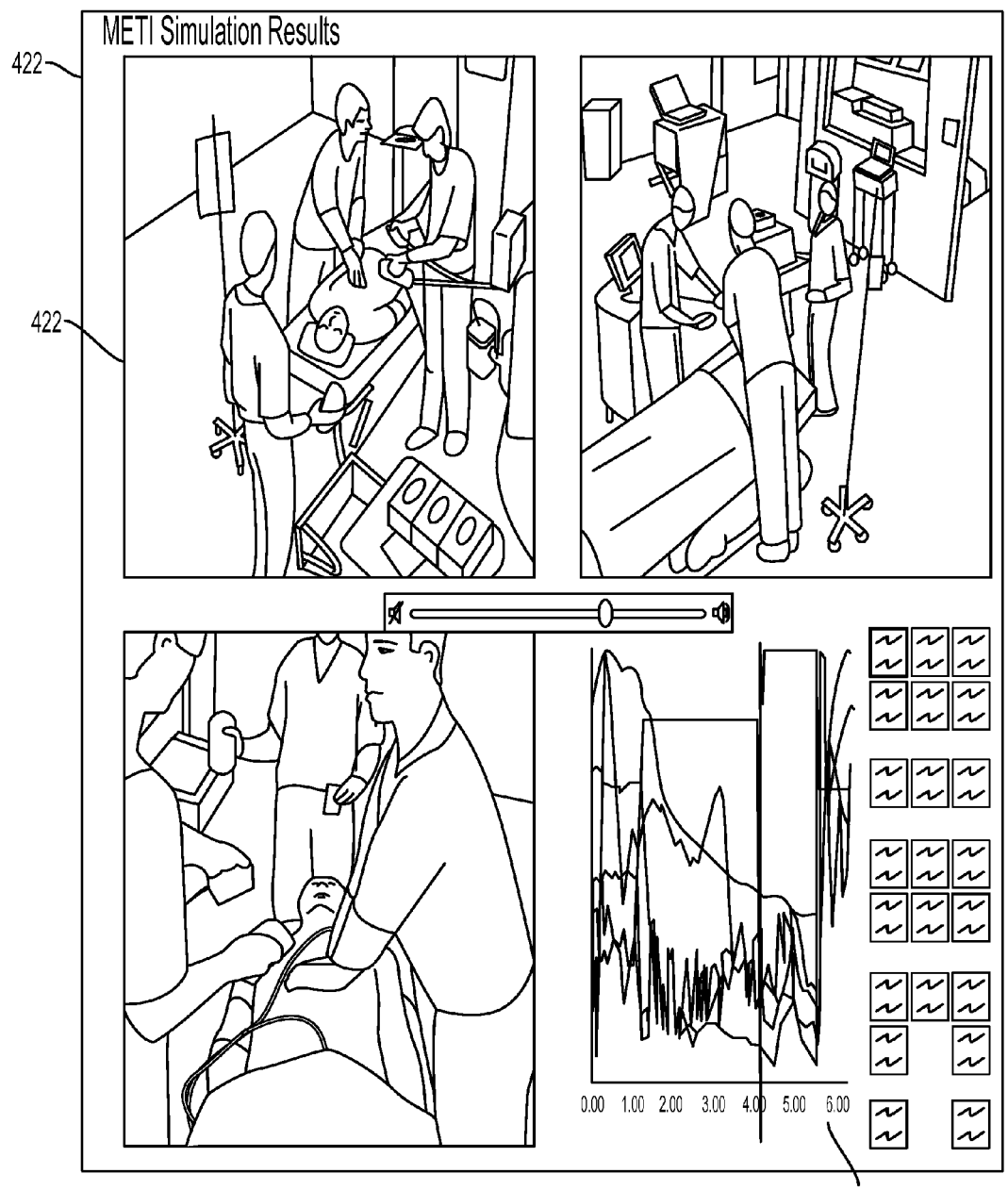

FIGS. 4A through 4B are example screenshots of the interface of the skills assessment tool 26 when the playing the stream. In the example shown in FIG. 4A, a skills assessment tool display screen 400 is shown that is divided into respective panes or windows 402 for playing each of the source videos files, and a window 404 for visualizing the simulator data. The simulator data may be displayed as a trend of telemetry values output from the simulator data source 24 as a function of time. Also shown is a timeline 406 of the recorded training session. In one embodiment, in the case where a prerecorded training session is played, the timeline 406 may also display points of interest along the timeline that were flagged by reviewers/evaluators during an annotation session, as described further below.

In this particular example, the simulator data shows physiological data may have been captured by a video screen capture, or by a visualization created from raw data captured from the simulator data source 24. The videos in each of the four windows 402 and 404, and the timeline 406 are played back synchronously, but each video is an independent and fully editable video file. By interacting with the timeline 406, the end-user is allowed to advance or return to any point in time in the synchronous playback of the videos.

FIG. 4B is a skills assessment tool display screen 420 synchronously playing three video windows 422, and one simulator data window 424 displaying the simulation data in a manner that identifies transition points of the telemetry values. An example of a transition point is summation data showing that a mannequin patient simulator went into cardiac arrest. Transition points are often an indicator of where during the training the trainee needs to perform a particular procedure and within a specified time frame.

Figure 4C:
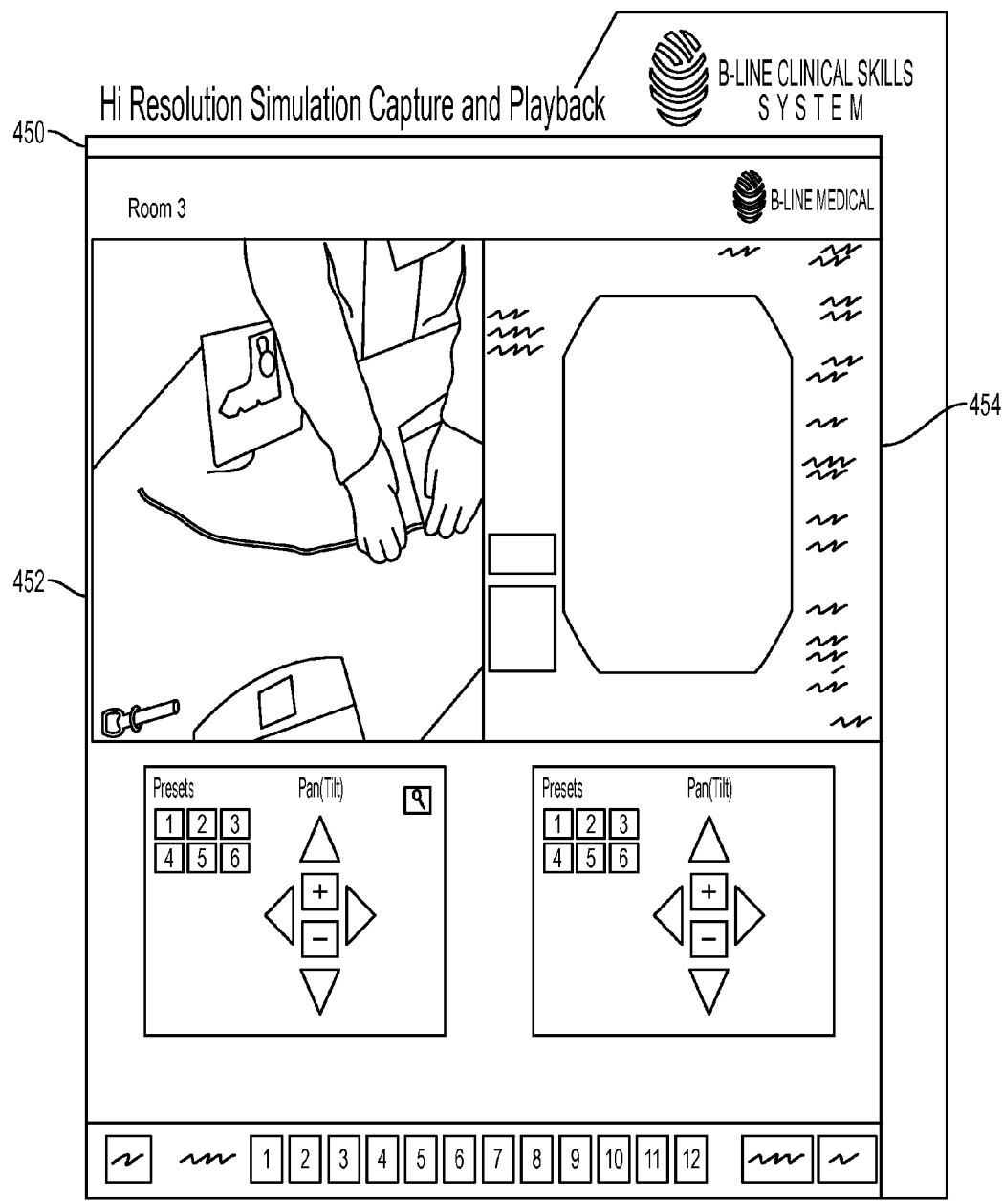

FIG. 4C is a skills assessment tool display screen 450 synchronously playing one video windows 452 with another video window 454 playing video of the display screen of a medical device data source.

Figure 4D:
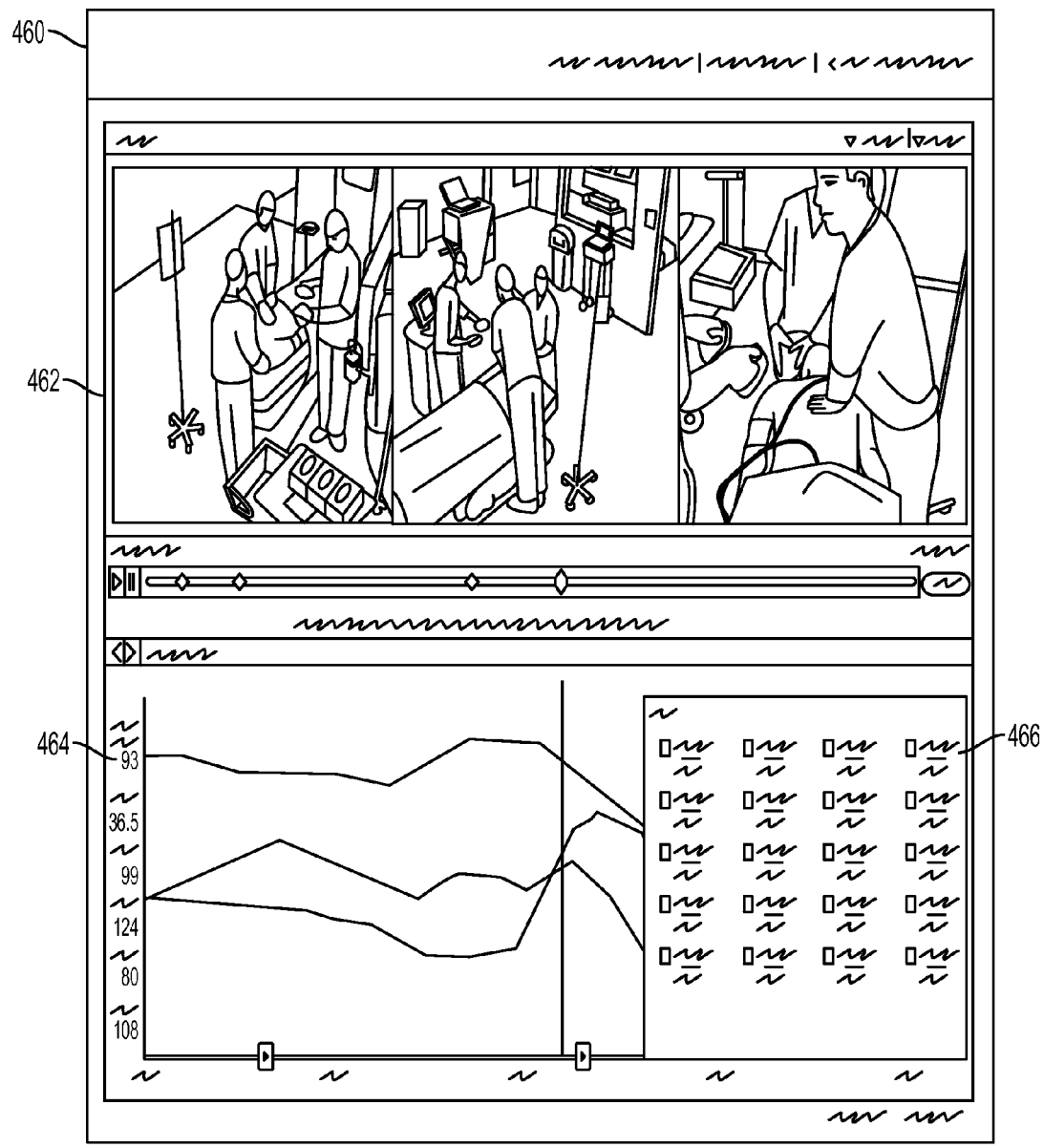

FIG. 4D is a skills assessment tool display screen 460 synchronously playing three video windows 464 and a simulation data window 464. The simulation data window shows a graph of telemetry information as well as a list 466 of variables that may be displayed in the graph. In this embodiment, the end-user can select from the list which variables to display to selectively control visualization of the telemetry information. The end-user may also select not only which variables to visualize, but also to specify an actual value for a selected variable to see where the value appears along the timeline.

The above examples show that the exemplary embodiments enable synchronous multimedia recording and playback, where with viewer is provided with remote playback control of the recording over a network of time, data, and event visualization.

Figure 5:
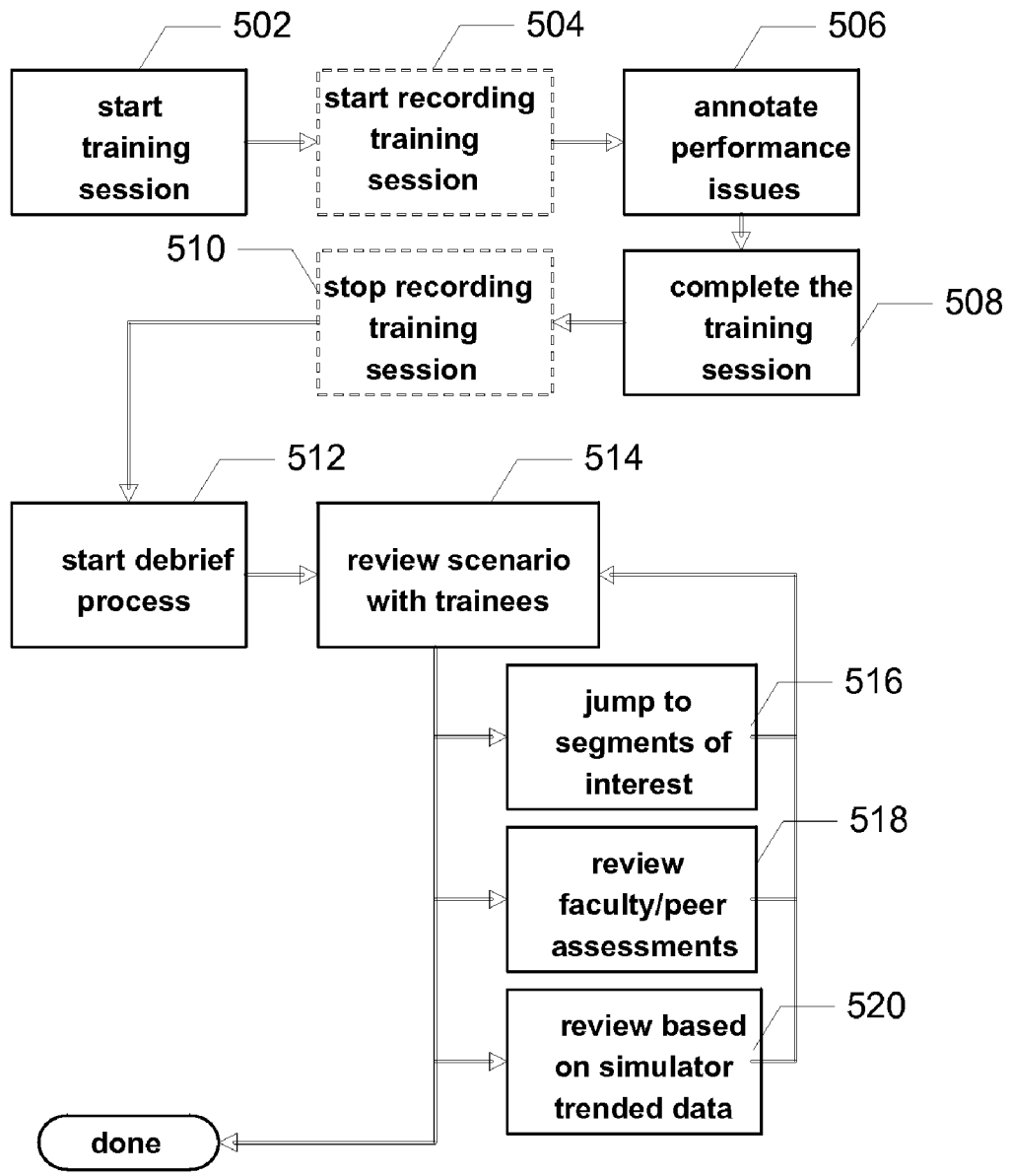
FIG. 5 is a flow diagram illustrating a workflow process implemented by the simulated training system and its interaction with the end-user for recording, annotating, and debriefing a recorded training session.

FIG. 5 is a flow diagram illustrating a workflow process implemented by the simulated training system 100 and its interaction with the end-user for recording, annotating, and debriefing a recorded training session. The process begins when a training session is initiated and the simulator source device 24 started (block 502). In response, the simulation capture tool 36 detects the starting of the simulator source device 24 and automatically starts training session recording by invoking the AV source devices 18 and encoders/recorders 20 (block 504).

As stated above, an end-user can access the skills assessment tool 26 and submit a request to view the training session live, and in response, the recorded training session is streamed to the client with the simulation data. According to a further aspect of the exemplary embodiment, the annotation and assessment tool 40 also enables the end-user to enter annotation and assessment data of the trainee's performance while the videos and simulation data are synchronously played back (block 506). This process is referred to as an annotation session.

In operation, once the end-user logs in to the server 28a from a browser 44 and accesses the assessment tool 40 (FIG. 1), the server 28a displays a list of live or prerecorded training sessions to access, or the end-user can search for a training session by entering metadata such as by case identification, or trainee identification.

In response to the user selecting a recorded training session, an assessment screen is displayed for displaying the training session. In the case of a live training session, the training session is played once the training session begins. In the case of a pre-recorded training session, the pre-recorded trade session is played automatically. Based on the session ID of the selected session, the session data from the session data archive 30 and the simulation data from the simulation data archive is retrieved and transmitted over the network by the servers 28a and 28b, as described above.

Figure 6A:
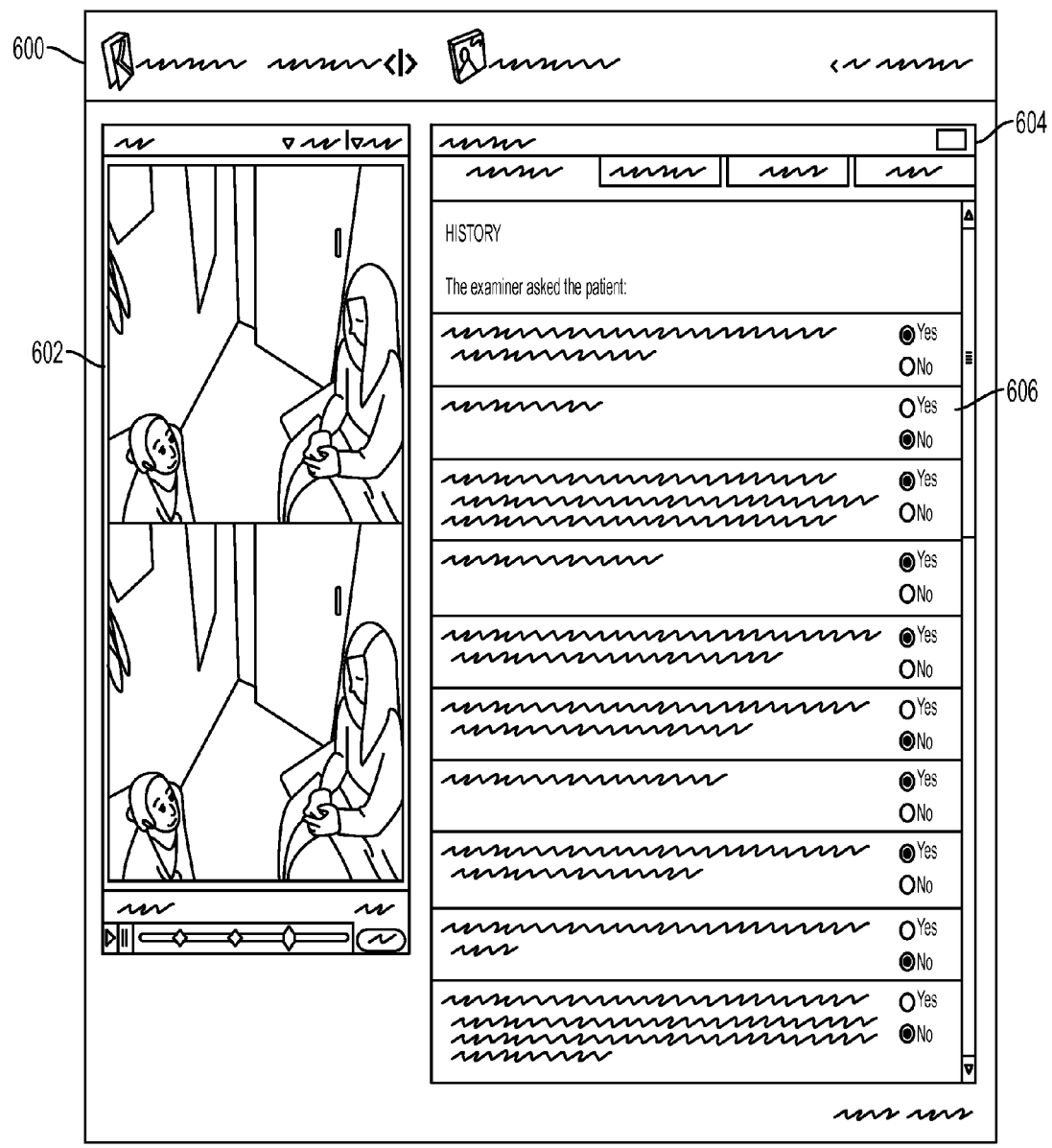
FIG. 6A is a diagram of an example assessment display screen.

FIG. 6A is a diagram of an example assessment display screen 600. In this embodiment, the annotation and assessment tool 40 displays video windows 602 and a window 604 for displaying a checklist 606 listing predefined training tasks to be completed by a trainee during the training session, and allows the end-user to indicate which of the listed tasks were completed during synchronous playback, thereby providing real-time annotation and assessment of the trainee. In this example, the end-user may provide answers to the checklist by simply clicking "Yes" or "No". In one embodiment, some of the tasks on the checklist 606 may be associated with a timestamp that specifies at what time during the training session particular item should have been performed. As a reviewer checks off tasks on the checklist, the annotation and assessment tool 40 compares the specified time with the time the reviewer checks off the task and indicates whether the task was performed within the specified time. Point values may be assigned based on proper or improper execution of the predefined tasks. Providing a predefined list of training tasks for evaluators to complete provides a more objective approach in providing skills assessment.

Figure 6B:
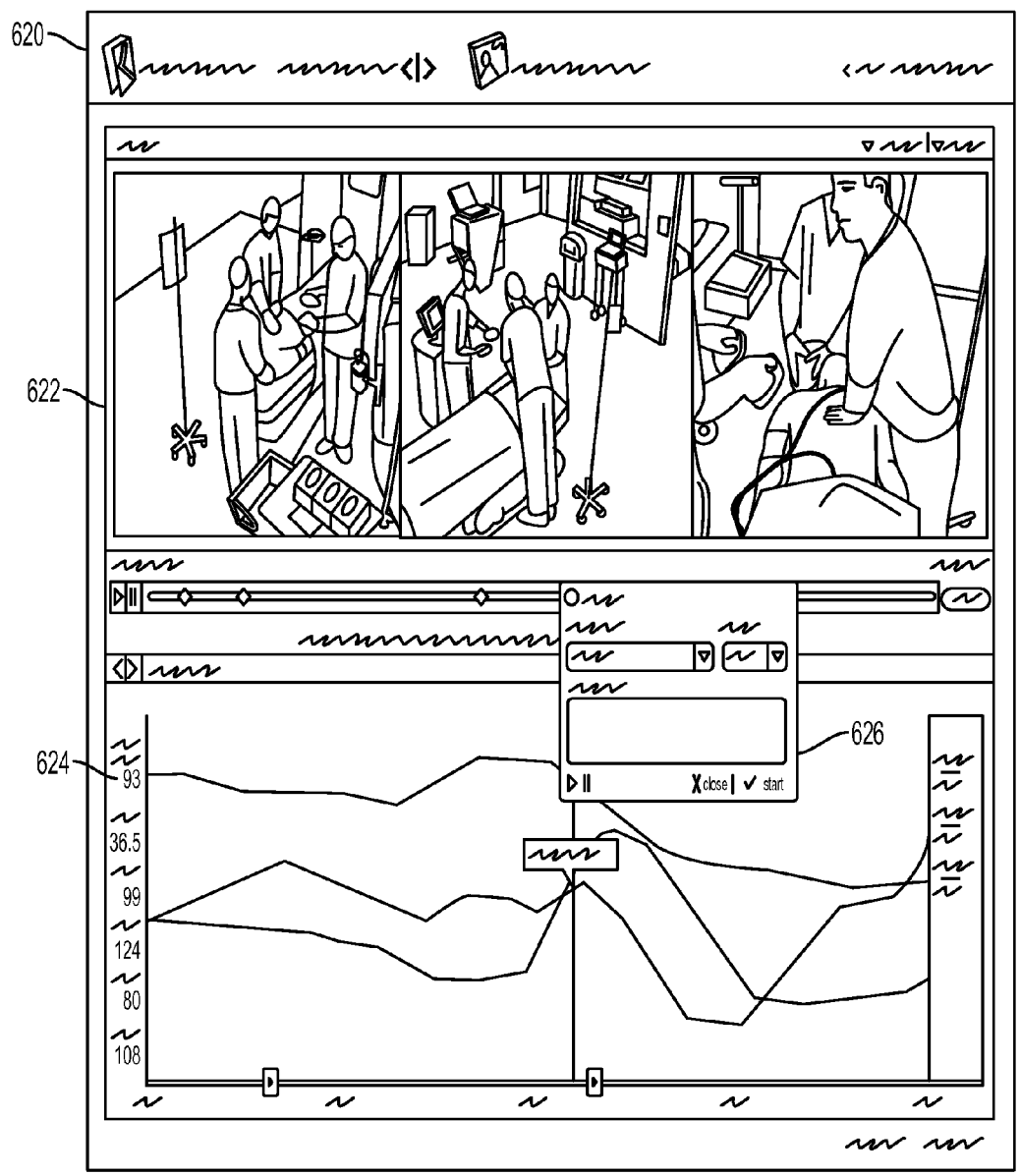
FIG. 6B is a diagram showing another example of an assessment display screen.

FIG. 6B is a diagram showing another example of an assessment display screen 620. In this example, the screen 620 includes three video windows 622 and a simulation window 624 showing a trend of simulation data. In addition, a dialog box 626 is displayed that allows the reviewer to identify a predefined event, and to enter a comment about the event to define points of interest that occurred during the training session. In addition, a rating can be associated with the event, and the event can be associated with the trainee(s).

Assessment sessions may be performed both in real time and subsequent to the training session. Because the recorded training session is provided over the Internet, annotation sessions may be performed by multiple reviewers at the same or different times. In addition, assessments can easily be done remotely. The annotation and assessment tool 40 stores the annotation and assessment data entered by the reviewers in the session data archive 30 in association with the training session and by the trainee(s). The annotation and assessment tool 40 may also automatically tally the annotations and assessments entered by the reviewers to create a composite assessment/score.

In one embodiment, trainees participating in a training session and the checklist of tasks to be completed during the training session are established prior to the training session. For example, prior to the training session, the trainer or the trainee can log into the assessment tool 40 to perform a pre-assessment in which the trainee enters information identifying the subject matter and participants of training session (integrated trainee identification). In addition, the trainer can login to the system and create a checklist of tasks to be completed by the trainees during the training session. The checklists can establish the order which the tasks must be performed as well as established when during the training session the tasks must be performed. Data defining the training session (e.g., date/time, case number, room number, and so on), checklist data, trainee data, and assessment data are all stored in the session data archive. Data in the session data archive 30 is preferably indexed by the training session, but can also be indexed by a group of trainees or by individual trainees. Because the recorded training session is stored in association with the group of trainees and the individual trainees in the session data archive 30, the assessment data can be segmented out by individual trainees and viewed to see that trainees performance. This allows all training sessions and assessment entered for particular trainee, i.e., the trainee's entire training portfolio, to be easily retrieved and viewed with few mouse clicks.

Referring again to FIG. 5, when the training session is completed (block 508), the simulation capture tool 36 detects the deactivation of the simulated data source, and turns-off the AV sources 18 and encoders/recorders 20 to end the recording (block 510). This also ends any live assessments sessions.

As described above, training centers 12 typically hold debriefing sessions where the recorded training session is reviewed by one of more evaluators with the trainees as a group or individually. According to a further aspect of the exemplary embodiment, the skills assessment tool 26 further includes a debrief tool 38 for enabling automated debrief sessions.

The debrief tool 38 is invoked in response to the end-user, typically the trainer/evaluator, choosing to start a debrief session from the browser 44 (block 512). The debrief tool 38 allows the end-user to select which recorded training session to view, and which videos in the training session to view, and the selected videos are synchronously played back, as described above and as shown in FIGS. 4A-4C, at which point the end-user begins to review the training scenario with the trainee(s) (block 514). A debriefing session is similar to an annotation session in that all the video feeds and simulation data may be displayed on one screen in the browser 44, but the debriefing session does not include a checklist or other area for the viewers to enter annotations. The end-user may choose to display only certain components from the recorded training session and how the simulator data should be visualized. The end-user can jump to segments of interest (block 516), choose to review faculty/peer assessments (block 518), or perform the review based on just the simulator trend data (520). For example, the trainer may only choose to display video streams 1 and 2 as well as the simulation data, and at the same time view the assessment data entered by Dr. Johnson, for instance.

Figure 7:
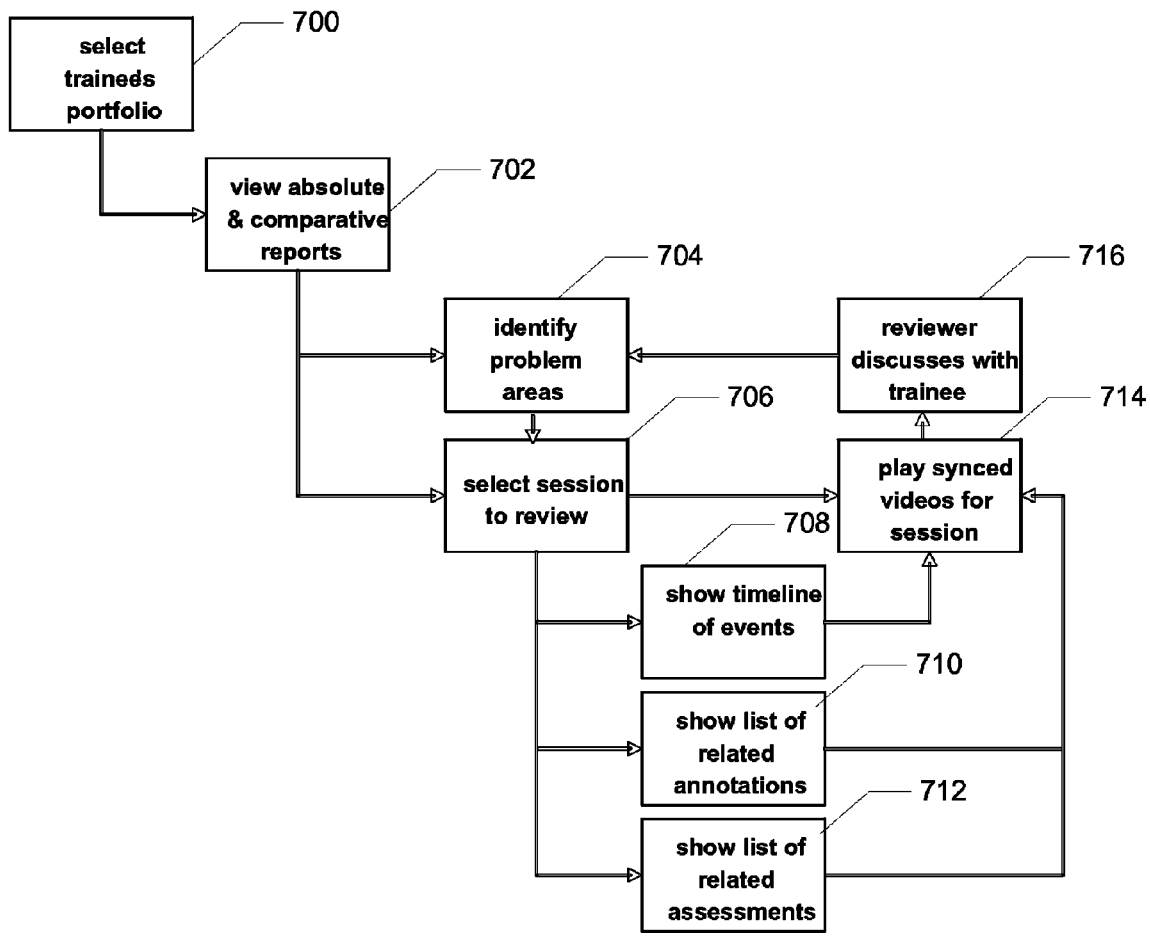
FIG. 7 is a block diagram illustrating a process performed by the debrief tool and its interaction with the end-user for conducting an individual debriefing session between a trainer and a trainer.

FIG. 7 is a block diagram illustrating a process performed by the debrief tool 38 and its interaction with the end-user for conducting an individual debriefing session between a trainer and a trainee. The process begins by the debriefing tool 38 receiving the trainer's selection of a trainee's portfolio (block 700). In response, the debriefing tool 40 retrieves all the annotations related to the trainee and combines them in real time into absolute and comparative reports from which the trainer may select to view (block 702). From the displayed reports, the trainer can identify problem areas (block 704), and then select from the interface of the debriefing tool 38 a particular recorded training session to review with the trainee (block 706. Once the recorded training session is played back (block 714), and the trainer is allowed to jump to any particular video clip. In addition, the trainer can show a timeline of events (block 708), show a list of related annotations and jump to a particular annotation point (block 710), and show a list of assessments related to the trainee (712), including any combination of faculty assessments, self-assessment, and peer assessments. The trainer then discusses the data with the trainee (block 716).

The combination of the annotation and assessment tool 40 and debrief tool 38 enables a discussion and review of a trainee's performance to be based on absolute and comparative metrics in combination with multiple evaluator assessments, all linked to video, thereby providing more objective feedback to the trainee and an overall improved training process.

A method and system for providing synchronous multimedia recording and playback has been disclosed. The present invention has been described in accordance with the embodiments shown, and one of ordinary skill in the art will readily recognize that there could be variations to the embodiments, and any variations would be within the spirit and scope of the present invention. In addition, the embodiments can be implemented using hardware, software, a computer readable medium containing program instructions, or a combination thereof. In addition, although the debriefing tool 38, and annotation and assessment tool 40 are shown as separate components, the functionality of each may be combined into a lesser or greater number of components.

Software written according to the present invention is to be either stored in some form of computer-readable medium such as memory or CD-ROM, or is to be transmitted over a network, and is to be executed by a processor. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having two or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, any other tangible medium from which a computer can read or suitable combination of the foregoing. As an alternative to the computer readable medium, the software, for example, may be transmitted over a network in a form of carrier waves. Accordingly, many modifications may be made by one of ordinary skill in the art without departing from the spirit and scope of the appended claims.

We claim:

1. A method for providing synchronous multimedia recording and playback, comprising:

synchronously recording in real-time, simulator data from a simulator captured by a simulator capture tool, and video of session captured by at least one audio/video source;

encoding the recorded video captured as a digital media file wherein the digital media file is formatted as streaming media;

transmitting the simulator data and the streaming media from a server to a client over a network;

integrating the streaming media and the simulator data for playback in a single web browser; and synchronously playing the streaming media with the simulator data in the single web browser on the client, wherein the synchronously playing comprises linking the streaming media with the simulator data such that the streaming media and the simulator data are both displayed with reference to a timeline and such that when moving to a particular point on the timeline, corresponding streaming media and simulator data are played from said particular point on the timeline.

2. The method of claim 1, wherein said synchronously recording comprises recording in real-time the video of the session being captured by a plurality of audio/video sources that include the at least one audio/video source and wherein said streaming comprises playing back in real time respective videos from the plurality of audio/video sources.

3. The method of claim 2, wherein the single web browser is divided into respective areas for each video.

4. The method of claim 3, wherein the streaming further comprises dynamically generating a composite view that references as sources respective streaming media files obtained by recording in real-time the video of a training session being captured by the plurality of audio/video sources, and streaming a single media file.

5. The method of claim 2, further comprising designating a primary audio source selected from one of the respective videos, turning off audio portion of remaining respective videos, and synchronizing, based on time, video with the primary audio source with the remaining respective videos and the simulator data.

6. The method of claim 2, wherein:
the respective videos comprise at least one video feed and at least one audio feed,
input from a user comprises at least one of text annotations, graphical annotations, assessments, posted questions, and comments;
the respective videos are seamlessly assembled in real-time and are streamed to at least one user, wherein the respective videos are streamed or obtained using at least one of internet, encoding device, a centralizing server, or locally or remotely stored video; and
streaming media obtained from the respective videos and the simulator data are viewable in real-time and after said synchronous recording using the web browser with a multimedia player.

7. The method of claim 2, further comprising storing the simulator data and digital media files obtained from the respective videos, and transmitting the synchronous playback on-demand, subsequent to the training session.

8. The method of claim 7, further comprising prior to the synchronous playback, allowing a user of the client to select which ones of the respective videos are played back.

9. The method of claim 2, further comprising enabling a user to enter questions, comments, annotations, and assessment data while the respective videos and the simulator data are synchronously played back.

10. The method of claim 9, further comprising during the synchronous playback in real-time, displaying a checklist of training tasks to be completed by a user, that indicate which tasks were completed during the synchronous playback for real-time annotation and assessment of a trainee.

11. The method of claim 10, wherein the stream is received and played back on multiple web clients to provide multiple simultaneous local and remote assessments by multiple users.

12. The method of claim 1, further comprising recording the simulator data as captured video of the simulator showing an output of the simulator.

13. The method of claim 12, wherein the video of the simulator data is also encoded as a streaming media file, and the video of the simulator data and the video of the A/V source are played back together in the single web browser.

14. The method of claim 1, further comprising recording the simulator data as telemetry values.

15. The method of claim 14, further comprising playing back the video and the simulator data in a multimedia player of the client.

16. The method of claim 14, further comprising playing back the simulator data as a graph line of the telemetry values along the timeline.

17. The method of claim 16, further comprising identifying transition points of the telemetry values during playback.

18. The method of claim 16, further comprising allowing a user to selectively control visualization of the telemetry information by selecting which data points to display during playback.

19. The method of claim 16, further comprising displaying points of interest along the timeline.

20. The method of claim 1, further comprising allowing a user to advance or return to any point in time in the synchronous play back of the video while playing by interacting with the timeline.

21. The method of claim 1, further comprising streaming the synchronous playback in real-time during the session such that the simulator data and the streaming media are played back synchronously in real-time.

22. A system for providing synchronous multimedia recording and playback, comprising:
at least one audio/video source which captures video of a session, the session including a use of a simulator;
a simulation capture tool which captures real-time simulator data from the simulator, wherein the simulator data and the video of the session are recorded synchronously;
one or more encoders which encode the video captured by the at least one audio/video source as a digital media file, wherein the digital media file is formatted as streaming media;
a transmitter which transmits the simulator data and the streaming media from a server to a client over a network;
an integration module which integrates the streaming media with the simulator data for playback in a single web browser; and
a playback module which plays back the received streaming media file in synchronization with the simulator data in the single web browser on the client,
wherein the integration module links the streaming media with the simulator data such that the streaming media and the simulator data are both displayed with reference to a timeline by the playback module and such that when moving to a particular point on the timeline, corresponding streaming media and simulator data are played by the playback module from said particular point on the timeline.

23. The system of claim 22, wherein the playback module comprises a assessment tool, and
wherein the assessment tool comprises:
an annotation and assessment tool which enables a user to enter questions, comments, annotation and assessment data of performance of a participant while the video and simulation data are synchronously played back by the playback module; and
a debrief tool which enables automated debrief session by allowing the user to select which recorded training session to view.

24. The system of claim 22, further comprising a plurality of audio/video sources including the at least one audio/video source, wherein respective videos from the plurality of audio/video sources are played back by the playback module in real time.

25. The system of claim 24, wherein the single browser window is divided into respective areas for each video.

26. The system of claim 22, wherein the playback module allows a user to advance or return to any point in time in the synchronous play back of the videos while playing by interacting with the timeline.

27. The system of claim 24, wherein prior to the synchronous playback by the playback module, a selection module allows a user to select which ones of the videos are played back.

28. The system of claim 24, wherein the simulator data is recorded by the simulation capture tool as captured video of the simulator showing an output of the simulator.

29. The system of claim 28, wherein the video of the simulator data is also encoded by the one or more encoders as a streaming media file, and the video of the simulator data and the respective videos are played back in the single web browser by the playback module.

30. The system of claim 24, wherein the simulator data is recorded by the simulation capture tool as telemetry values.

31. The system of claim 30, wherein the simulator data is played back by the playback module as a graph line of the telemetry values along the timeline.

32. The system of claim 31, wherein transition points of the telemetry values are identified during playback by the playback module.

33. The system of claim 31, further comprising a user interface that receives user input in which the user selectively controls visualization of the telemetry information.

34. The system of claim 31, wherein points of interest are displayed along the timeline during playback by the playback module.

35. The system of claim 30, wherein the video is played back and the simulator data is played back by the playback module in a multimedia player of the client.

36. The system of claim 22, wherein the synchronous playback is streaming in real-time during the session by the one or more encoders.

37. The system of claim 22, further comprising a storage module which stores the simulator data as streaming media files, wherein the one or more encoders stream the synchronous playback subsequent to the session.

38. The system of claim 22, wherein during the synchronous playback in real-time by the playback module, the playback module displays a checklist of training tasks to be completed by a user is displayed, and further comprising an input module which allows a user to indicate which tasks were completed during the synchronous playback for real-time annotation and assessment of the trainee.

39. The system of claim 22, wherein the stream is received and played back by the playback module on multiple web clients to provide multiple simultaneous local and remote assessments by multiple users.

40. The system of claim 22, wherein the playback module further comprises an assessment administration interface that allows input for pre, live, and post assessment of the session.

41. The system of claim 22, wherein the playback module synchronizes and visually links the timeline with other data comprising captured computer screens or charted data from the simulator allowing the user to navigate the timeline.

42. The system of claim 22, further comprising an annotation module that allows the user to post questions or comments to other users that are visually represented on the timeline.

43. The system of claim 22, further comprising an interface module which generates an interface in which the respective user documents sessions, annotations, posts, and usage statistics.

44. The system of claim 22, wherein the at least one encoder indexes the video such that text in the video is searchable.

45. The system of claim 22, the playback module further comprises an interface module which allows a user to associate individualized assessments to participant types.

46. The system of claim 22, wherein the simulation capture tool is at least one audio/video source that captures the simulator data.

47. An executable software product stored on a non-transitory computer-readable medium containing program instructions for providing synchronous multimedia recording and playback, wherein video of a session is captured by at least one audio/video source, the program instructions comprising:
synchronously recording with the video, real-time simulator data from a simulator captured by a simulator capture tool;
encoding the video captured by the at least one audio/video source as a digital media file, wherein the digital medial file is formatted as streaming media;
transmitting the simulator data and the video media file from a server to a client over a network;
integrating the streaming media and the simulator data for playback in a single web browser; and
playing back the video in synchronization with the simulator data in the single web browser,
wherein the playing back comprises linking the streaming media with the simulator data such that the streaming media and the simulator data are both displayed with reference to a timeline and such that when moving to a particular point on the timeline, corresponding streaming media and simulator data are played from said particular point on the timeline.

48. A method for providing synchronous multimedia recording and playback, comprising:
synchronously recording in real-time data output from a medical device, and video of a medical procedure related to the medical device, wherein the medical procedure is captured by at least one audio/video source;
encoding the recorded video captured as a digital media file wherein the digital media file is formatted as streaming media;
transmitting the data and the streaming media from a server to a client over a network;
integrating the streaming media and the simulator data for playback in a single web browser; and
synchronously playing the streaming media with the data in the single web browser on the client, wherein the synchronously playing comprises linking the streaming media with the simulator data such that the streaming media and the simulator data are both displayed with reference to a timeline and such that when moving to a particular point on the timeline, corresponding streaming media and simulator data are played from said particular point on the timeline.

49. A system for providing synchronous multimedia recording and playback, the system comprising:

means for synchronously recording in real-time data output from a simulator or medical device and video of a corresponding procedure related to the medical device or the simulator, wherein the corresponding procedure is captured by at least one audio/video source;

means for encoding the recorded video captured as a digital media file wherein the digital media file is formatted as streaming media;

means for transmitting the data and the streaming media from a server to a client over a network;

means for integrating the streaming media and the simulator data for playback in a single web browser; and means for synchronously playing the streaming media with the data in the single web browser on the client, wherein the means for integrating links the streaming media with the simulator data such that the streaming media and the simulator data are both displayed with reference to a timeline and such that when moving to a particular point on the timeline, corresponding streaming media and simulator data are played by the means for synchronously playing from said particular point on the timeline.

50. The method of claim 1, wherein the timeline further links annotations with the stimulator data and the streaming media.

51. The method of claim 1, further comprising a time sync generator that is coupled to the simulator and the simulator capture tool and that controls synchronization of the recordings.

52. The method of claim 1, wherein the time sync generator calculates relative time of the simulator data with respect to the streaming media.

53. The method of claim 1, wherein all of participants that interact with the simulator in the session are present in the room.

54. The method of claim 1, further comprising mixing the various video data prior to the synchronous playback forming streamed composite media file.

55. The method of claim 54, further comprising dynamically mixing the various video data prior to the synchronous playback forming streamed composite media file.

56. The method of claim 54, wherein the simulator data and the streamed composite media file are synchronously played back based on time of the recordings.

57. The method of claim 10, wherein the checklist is displayed in an area within the single web browser and the real-time annotations are applied to the streaming media and the simulator data being synchronously played-back in the single web browser.

* * * * *